Jan. 17, 1928.
W. C. HANNA ET AL
1,656,788
WEEDER ATTACHMENT FOR HARROWS
Filed March 3, 1926
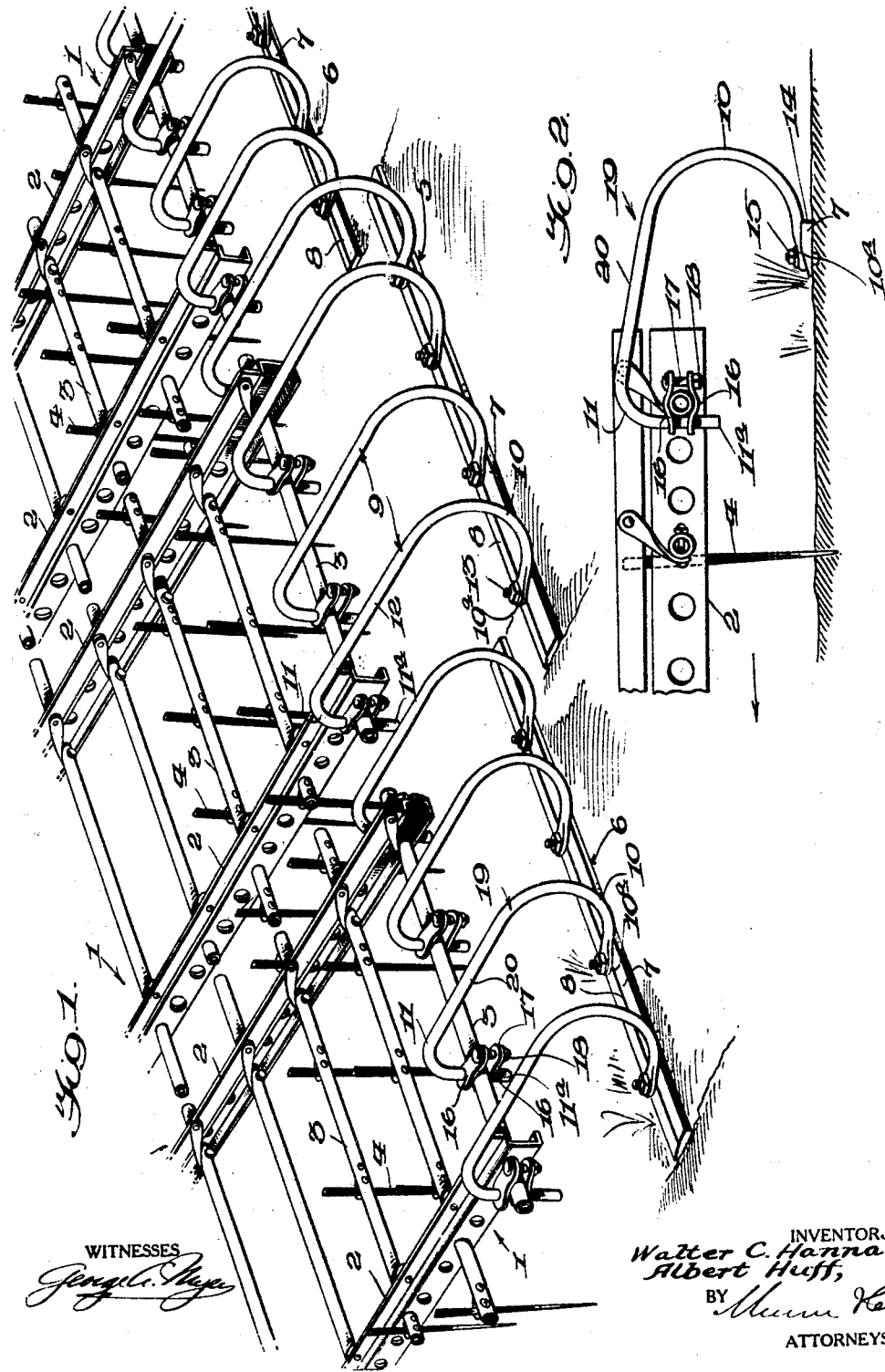
WITNESSES
INVENTORS
Walter C. Hanna and
Albert Huff,
BY
ATTORNEYS Patented Jan. 17, 1928.

1,656,788

UNITED STATES PATENT OFFICE.

WALTER C. HANNA AND ALBERT HUFF, OF DUFUR, OREGON.

WEEDER ATTACHMENT FOR HARROWS.

Application filed March 3, 1926. Serial No. 92,068.

Our invention relates to improvements in weeder attachments for harrows, and it consists in the combinations, constructions and arrangements herein described and claimed.

An object of the invention is the provision of an attachment of the character described which affords facilities for supporting a scraper blade at the rear of a harrow so that weeds, grasses, roots and like vegetable matter will be removed bodily from the cultivated earth and the surface of the earth broken up and leveled.

A further object of the invention is the provision of an attachment of the character described which can be adjusted to vary the depth to which the scraper blade will cut into the earth.

Other objects and advantages of the invention will be apparent from the following description, considered in conjunction with the accompanying drawings, in which Figure 1 is a fragmentary perspective view, showing the harrow equipped with a weeder attachment embodying the invention, and Figure 2 is a fragmentary side elevation of associated portions of the harrow frame and the weeder attachment.

In Figure 1 we show a harrow which comprises three sections arranged side by side, each section being generally designated 1. Each harrow section comprises a pair of spaced side beams 2 which support the spaced cross rods 3. The cross rod 3 carry the harrow teeth 4.

The particular weeder attachment shown in Figure 1 comprises a middle section generally designated at 5 which is associated with the rear cross bar 3 of the middle section 1 of the harrow and a pair of end sections, generally designated 6, which respectively are associated with the rear cross bars 3 of the end sections of the harrow. Each of the sections of the weeder attachment includes a substantially flat cutter or scraper bar 7 which is of greater length than the width of the harrow section with which it is associated. Each cutter bar 7 has the upper face thereof beveled from its front edge rearwardly for a considerable part of the width of the cutter bar, as indicated at 8, whereby the cutter bar will have a substantially sharp front cutting edge. The cutter bars of course are disposed parallel to the cross rods of the harrow sections with which they are associated.

The cutter bar 7 of the middle section of the attachment is connected with the rear cross rod 3 of the middle section of the harrow by a plurality of rod-like supporting members 9, each of which is formed in a single piece and comprises a substantially C-shaped rear portion 10, a substantially right angular front end portion 11 and a substantially straight horizontal middle portion 12. The extreme end portion of the part 10 of each member 9 is flattened as indicated at 10ª and is apertured for the reception of a suitable fastening element, such as the bolt 13. The bolt 13 is projected upwardly through an opening 14 in the beveled portion of the associated cutter bar 7 and then through the opening of the end portion 10ª of the associated member 9 and is engaged by a nut 15 which can be tightened to secure the cutter blade 7 of the middle section of the attachment to the associated member 9.

The right angular front end portion 11 of the member 9 includes a depending end portion 11ª which extends through vertically aligned openings in the front end portion of a pair of cross members 16. The members 16 are shown as being bars which respectively extend across the rear cross rod 3 of the middle harrow section above and underneath the latter. The rearward end portions of these members 16 are connected by adjustable fastening means, such as the bolts 17, which extends through vertically aligned apertures in the rear end portion of the members 16 and the nut 18 which engages the bolt 17. When the nut 18 is tightened, the members 16 will be clamped to the associated cross rod 3 and the walls of the openings in the front end portions of the members 16 will be forced into frictional engagement with the end portions 11ª of the associated member 9 so that the latter will be firmly connected with the associated cross rod 3 and will be releasably held in vertically adjusted position. The adjustment of the member 9 vertically of course is effected by moving the end portion 11ª of that member 9 vertically in the openings of the associated members 16 before the nut 18 is tightened on the bolt 17 which connects the rearward end portions of the members 16. The depth to which the cutting edge of the bar 7 of the middle section of the attachment will cut into the earth therefore may be varied within limits.

The cutter bar 7 of each of the end sections of the attachment is connected with the rear cross rod 3 of the corresponding section of the harrow by a plurality of supporting members 19, each of which comprises a substantially C-shaped rear end portion identical with the portion 10 of the hereinbefore described supporting member 9 and a substantially right angular front end portion which is identical with the front end portion 11 of the member 9. Therefore, the same reference numerals have been used to designate corresponding end portions of the members 9 and 19. The rear end portion 10 of each member 19 is connected with the associated cutter bar 7 in the same manner as the rear end portion 10 of the member 9 is connected with the cutter bar 7 of the middle portion of the attachment. Also, the front end portion 11 of each member 19 is adjustably connected with the rear cross rod 3 of the corresponding harrow section in the same manner as the front end portion of the member 9 is connected with the rear cross rod 3 of the middle harrow section. The same reference characters have been used to designate like parts at corresponding ends of the members 9 and 19. Each member 19 differs from each member 9 in that the substantially horizontal and straight middle portion of the member 19, indicated at 20, is considerably shorter than the portion 12 of the member 9.

From the foregoing description of the various parts of the device, the operation thereof may be readily understood. When the middle cutter bar 7 and the end cutter bars 7 are attached to the main section 1 and the end sections 1 of the harrow in the manner just described, the end cutter bars 7 will be positioned in advance of the middle cutter bar 7 and the inner end portions of the end cutter bars 7 will extend midway beyond the ends of the middle cutter bar 7. The cutter bars will slide edgewise with the harrow with the lower faces of the cutter bars disposed substantially flatwise. The supporting members 19 and 9 may be adjusted on the rear cross bars 3 of the associated harrow sections so that the cutter bars will cut to any one of a plurality of different depths into the earth or will skim along the surface of the earth. It is obvious that weeds, grass, roots, and other like matter will be severed from the earth by the cutter blades and that these cutter blades also will serve to scrape and level the cultivated surface of the earth. Also, the sharp edges of the cutter blades will cut through relatively large lumps of earth and will break up the same and therefore the attachment will aid in cultivating the soil.

Obviously, our invention is susceptible of embodiment in forms other than that which is illustrated in the accompanying drawings, and we therefore consider as our own all such modifications and adaptations thereof as fairly fall within the scope of the appended claim.

We claim:—

The combination with a harrow consisting of a middle section and a pair of end sections, of a weeder attachment comprising a middle section and a pair of end sections, said weeder sections connected to the corresponding harrow sections, and each weeder section comprising a straight longitudinal cutter blade, the end blades set in advance of the middle blade and overlapping the ends of the same, adjustable means attached to the harrow frames for supporting said cutter bars, said means being capable of varying the angle of the cutter blades.

WALTER C. HANNA.
ALBERT HUFF.